(12) United States Patent
Bowsman et al.

(10) Patent No.: US 6,564,814 B2
(45) Date of Patent: May 20, 2003

(54) ENGINE DECARBONIZING SYSTEM

(76) Inventors: Shelba F. Bowsman, 13622 Pinecrest Dr., Largo, FL (US) 33774; Peter Cosentino, 13622 Pinecrest Dr., Largo, FL (US) 33774

( * ) Notice: Subject to any disclaimer, the term of this patent is extended or adjusted under 35 U.S.C. 154(b) by 47 days.

(21) Appl. No.: 09/784,742

(22) Filed: Feb. 15, 2001

(65) Prior Publication Data

US 2002/0116782 A1 Aug. 29, 2002

Related U.S. Application Data

(63) Continuation-in-part of application No. 09/777,218, filed on Feb. 5, 2001, now abandoned, which is a continuation-in-part of application No. 09/515,561, filed on Feb. 29, 2000, which is a continuation-in-part of application No. 08/862,376, filed on May 23, 1997.

(51) Int. Cl.[7] .................................................. B08B 9/00
(52) U.S. Cl. ................................. 134/102.1; 134/169 A
(58) Field of Search .......................... 134/102.1, 102.2, 134/169 A

(56) References Cited

U.S. PATENT DOCUMENTS

| | | | | |
|---|---|---|---|---|
| 1,356,967 A | * | 10/1920 | De Clairmont | 134/169 A X |
| 4,606,311 A | * | 8/1986 | Reyes et al. | 134/169 A X |
| 6,000,413 A | * | 12/1999 | Chen | 134/102.2 |

* cited by examiner

Primary Examiner—Philip Coe

(57) ABSTRACT

An engine decarbonizing system comprises a manifold with one central and four lateral bores. Pressurized air and decarbonizing fluid in separate containers are adapted to be co-mingled and fed to and through the manifold. A tube assembly has an output tube and two parallel input tubes operatively coupled. The output tube is coupled to the central bore and the two parallel input tubes are coupled to the containers for dispensing pressurized decarbonizing fluid. Four short tubes are coupled to the lateral bores and second ends have a rigid cylindrical nozzle selectively positionable within a spark plug for the delivery of a spray of pressurized decarbonizing fluid. Four switches are coupled to the manifold adjacent to the interface between a short tube and a short bore for selectively allowing or precluding the flow of decarbonizing fluid.

5 Claims, 17 Drawing Sheets

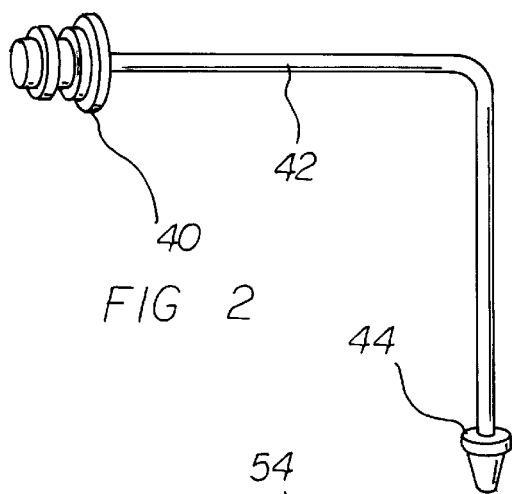
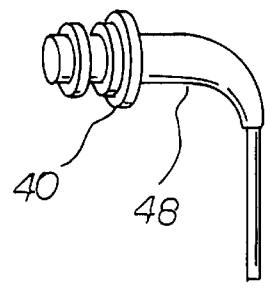
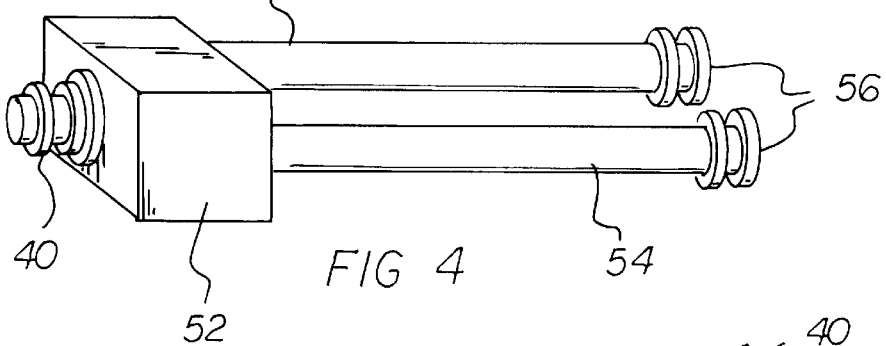
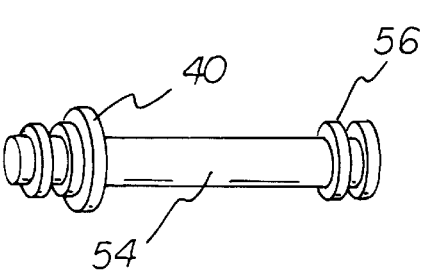
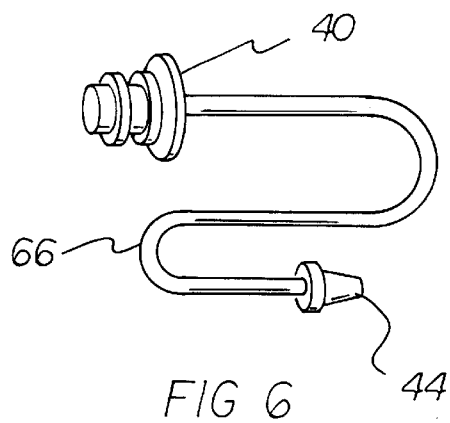

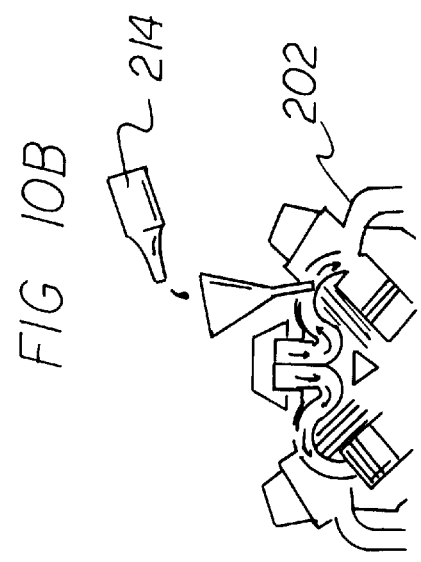
FIG 10B
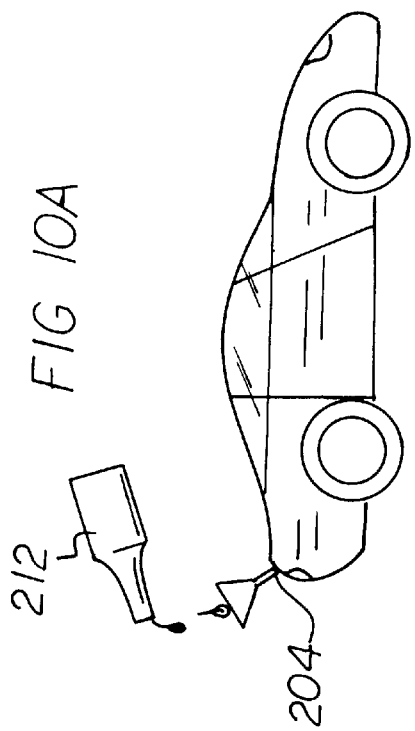
FIG 10A
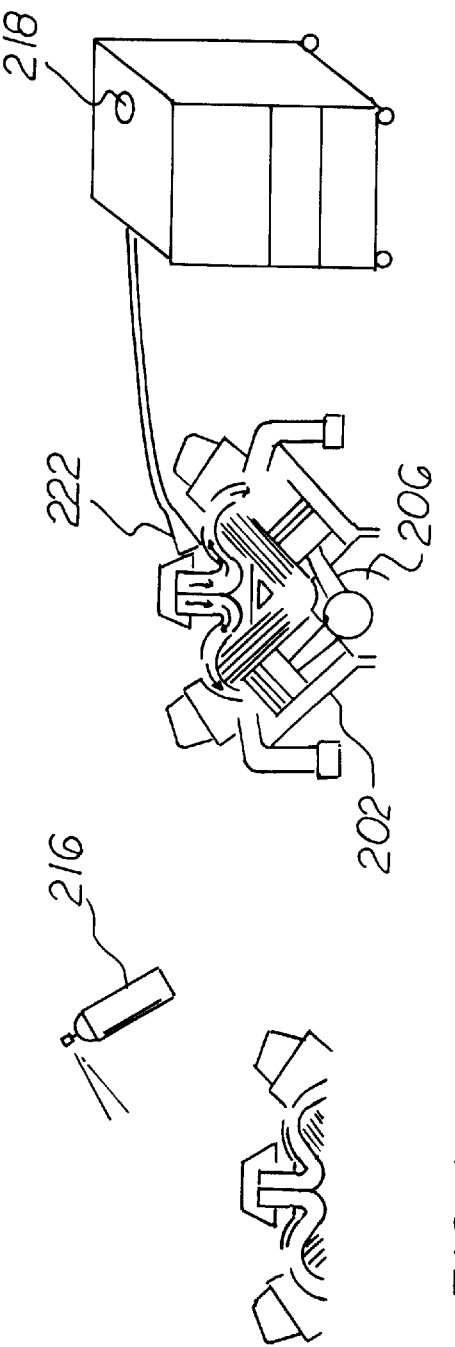
FIG 10D
FIG 10C

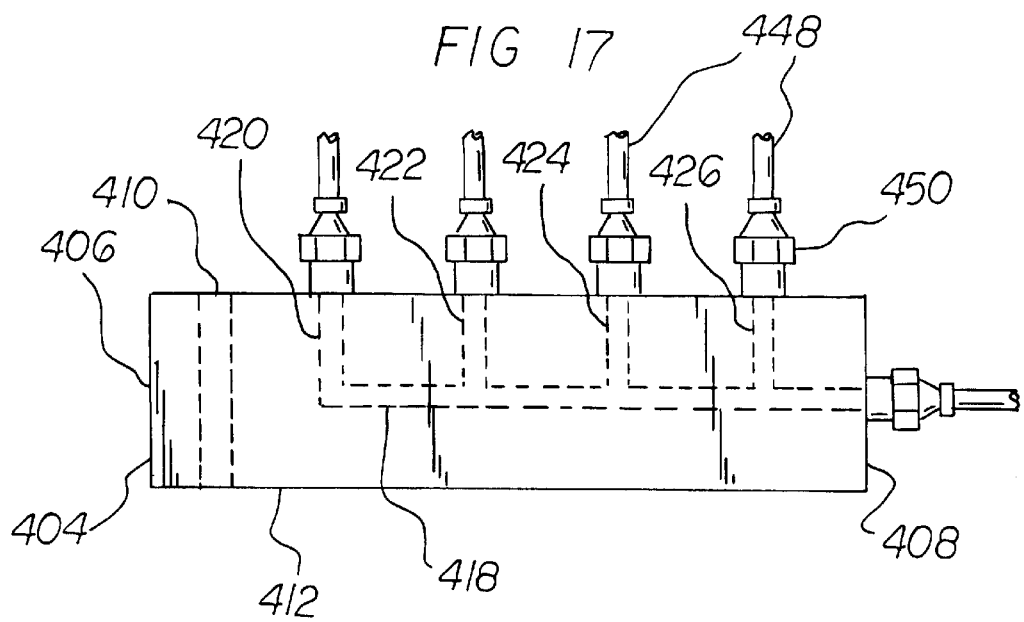
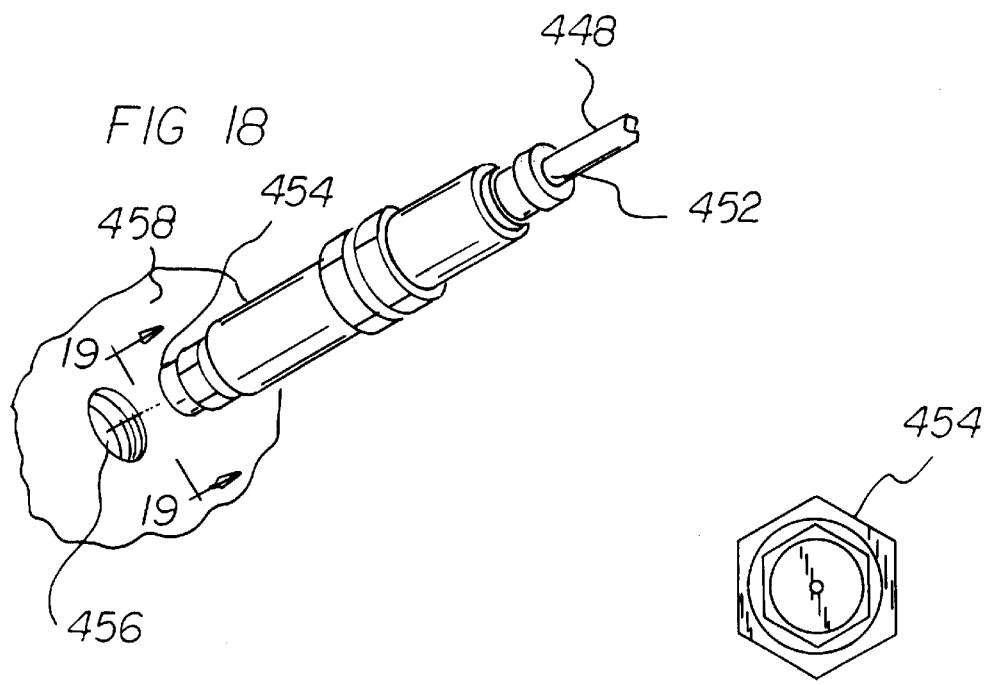

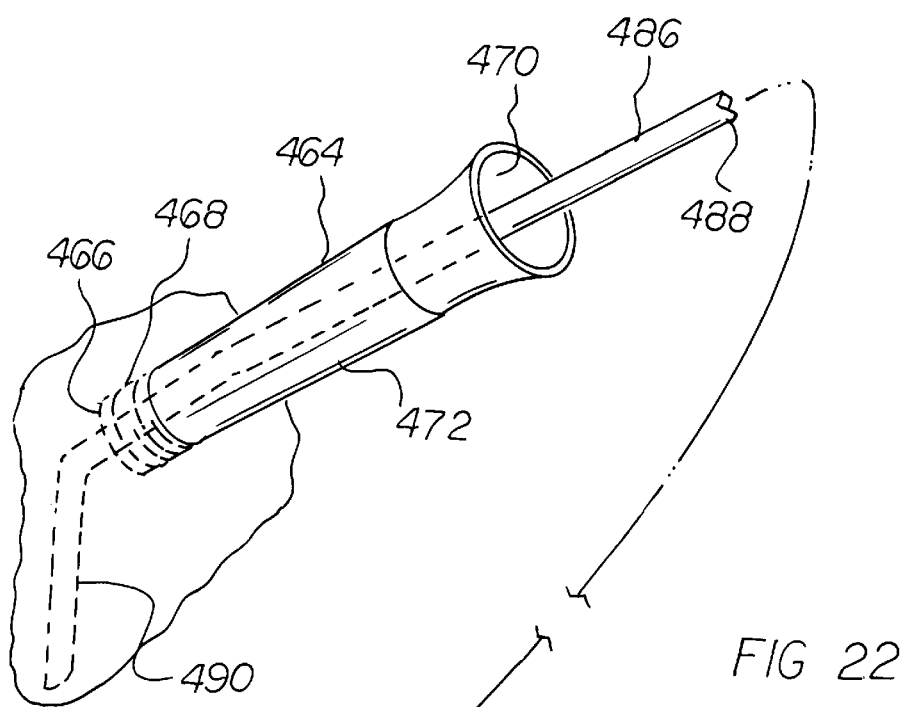
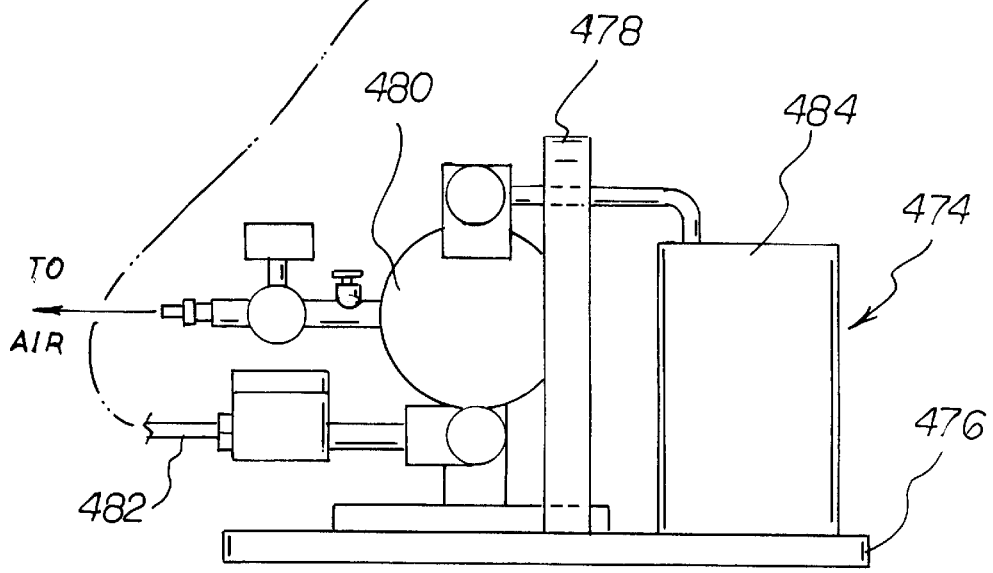
FIG 22

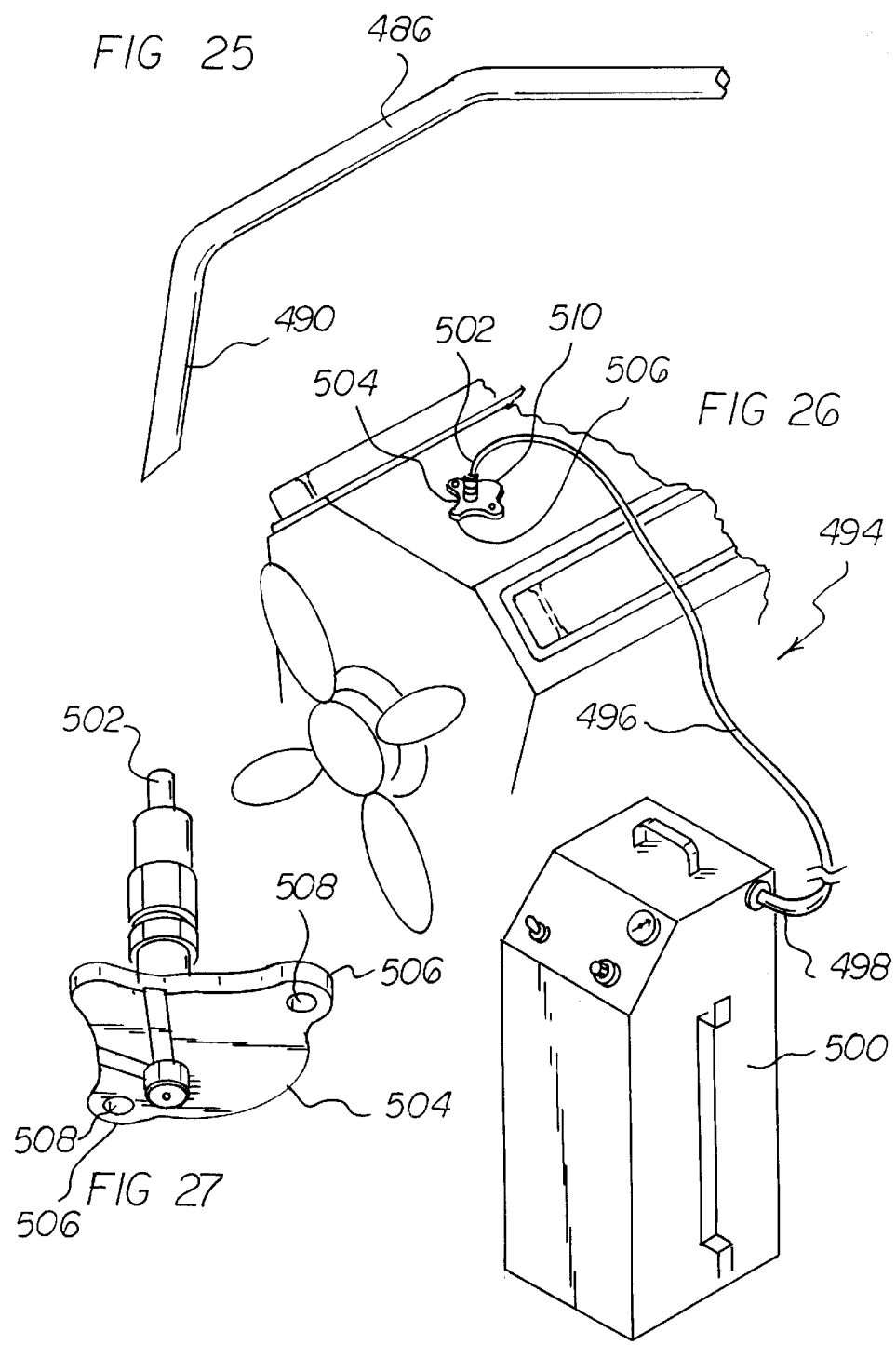

ENGINE DECARBONIZING SYSTEM

RELATED APPLICATION

This application is a continuation in part of co-pending application Ser. No. 09/777,218 filed Feb. 5, 2001, now abandon, which is, in turn a continuation in part of co-pending application Ser. No. 09/515,561 filed Feb. 29, 2000 entitled "Thorough Air Induction, Fuel Injection And Decarbonization Cleaning Machine And Process That Requires No Disassembly of The Engine or Its Components Which Uses Compressed Air as Its Source of Power" which is, in turn, a continuation in part of application Ser. No. 08/862,376 filed May 23, 1997 also entitled "A Vehicular Air Induction and Fuel Injection System Cleaner" (as amended).

CROSS REFERENCES TO RELATED APPLICATIONS

The machine requires the use of an attachment determined by the type of engine being serviced. Additionally, there are some engines that cannot accept the chemical directly from the machine itself. An apparatus accompanies the machine so that those engines can receive the benefit of the process in another fashion.

BACKGROUND

1. Field of Invention

This invention relates to a mechanism to clean and decarbonize the air induction and fuel injection systems. It is quick, easy and thorough especially as it relates to both fuel injected and carbureted vehicles and requires no disassembling of the engine.

2. Description of Prior Art

The process of cleaning fuel injection systems has been around for many years. However, it requires the disassembly of the various engine parts, which is expensive and time consuming. The less complicated alternative to a disassembly is to pour a chemical additive into the fuel tank in the hope that it will clean thoroughly, which it never does, because it never touches the engine's vital components where carbon builds up.

Automotive emissions are considered a major contributor to air pollution. The cumulative effect of such emissions resulted in significant changes in the automotive manufacturing industry both here and abroad. Such changes have produced vehicles with less toxic emissions than ever before.

Prior to 1963 emission controls did not exist. After that the automotive industry continued year after year to comply with government regulations that were established to eventually completely eliminate all toxic emissions from vehicles. This has essentially been done with the improvement of the fuel injection system.

The evolution of the fuel injection system now present on all modern day vehicles began in 1903 at Kitty Hawk with the first airplane, the "Wright Flyer" which was equipped with a fuel injection system.

Fuel injection is simply a method of delivering a mixture of fuel and air to the engine's cylinders. This is the same thing that is done by the carburetor but with a fuel injection system it can be done much more efficiently.

A carburetor is a device that vaporizes and delivers liquid fuel such as gasoline and mixes it with air in the proper ratio for combustion in an internal combustion engine such as engines powered by gasoline.

Gasoline has to be mixed with air in a ratio of between 12:1 and 16:1. Unfortunately, a spread of ratios like that can burn too much fuel if the mixture is too rich, destroy valves and even pistons if it is too lean, and reduce power if the mixture is too far on the other side of the best ratio and create clouds of pollution. In order to get the most horsepower out of the smaller engines, to reduce emissions to an absolute minimum, to get the best mileage per gallon and to keep the engine running at optimum between oil changes and tune ups a ratio of 17.7:1 is required at all speed ranges and throttle openings. It is because of this that the carburetor is inferior to the more sophisticated fuel injection system.

Modern fuel injection utilizes sensors mounted on various parts of the engine. The engine's computer can determine what fuel/air mixture is required.

The air intake system is simply an air gate that allows the incoming air change to be correctly measured. Therefore, there is no concern about introducing a uniform mixture of gas into the air flow. The fuel is injected into the air mass outside of the intake valve so that the atomization can be controlled precisely, delivery can be timed, and there is no problem with the cylinders furthest from the carburetor being too lean or those closest being too rich. The computer can interpret the temperature of the engine, the mass of air flowing through the intake system, the rpm, how far the throttle is open, the air pressure inside the air intake manifold, the outside air pressure and many other factors which adjust the fuel mixture to meet the requirements of the engine. This occurs over a thousand times per second.

The problems arise as a result of regular day to day driving which creates a buildup of contaminants in the fuel and air intake systems. Once this buildup begins, the residue acts like a magnet attracting more and more contaminants. This buildup can cause various problems with the engine such as rough idling, engine run on, hesitating, surging, stalling, pinging, knocking, misfiring, poor gas mileage, toxic emissions and general bad performance and driveability.

Fuel is introduced through the fuel tank and air enters from the air filter. These elements are required for an engine to operate, however, contaminants begin building up as the engine operates. These are the carbon and combustion deposits that automotive technicians work hard to remove from the upper engine area and finding it difficult-to-impossible to do.

Previously, in order to remove such deposits, mechanics would have to either use chemicals which would only superficially and temporarily clean the engine (U.S. Pat. No. 4,787,348 to Timothy A. Taylor and assigned to Parker Automotive Corporation) or run cleaner through the rail and fuel injectors by disabling the electric fuel pump, a process which is time consuming and only cleans the fuel rail, fuel injectors and the intake valves. As a last resort, mechanics would take the upper engine apart in order to clean the individual parts. This is extremely difficult, very time consuming, and costly.

It was necessary to devise a mechanism that would clean the air induction system, fuel system, and catalytic converters where carbon, varnish, dirt and gum build up in the engine and exhaust. The air induction system also must be cleaned in order to achieve the best possible engine performance. This is especially true for multiport systems where the fuel and air enter at different points.

The Engine Enhancer™ machine and chemicals clean these systems and the process requires no dismantling of the engine. Further, the attachments make it possible to perform the process on a wide variety of engines. This is done because a mechanism is used which pressurizes the chemical and results in a very thorough cleaning.

OBJECTS AND ADVANTAGES

Accordingly, several objects and advantages of this invention are that this invention and process requires no dismantling of the engine. Further the attachments make it possible to perform the process on a wide variety of engines. This is done because a mechanism is used which pressurizes the chemical and results in a very thorough cleaning.

Other objects and advantages include a small and compact tool cabinet which makes it easily transportable. A further object and advantage is that the cabinet has a 9-foot hose which allows the chemical to be remote from the engine being serviced. Further, the process is easy to perform and successfully removes the contamination.

Additional objects and advantages involve the energy source for the invention, which operates by using pressurized air. Therefore, no electrical connections are necessary.

The regulator, on/off valve and pressure gauge have no chemical traveling through them. This prevents their rapid destruction. Further, this invention has incorporated a sight glass, on/off product control valve, strainer and quick disconnect in order to make it versatile to connect multiple attachments for various types and sizes of engines.

It is a further object of this invention to provide an engine decarbonizing system comprising a manifold with one central and four lateral bores. Pressurized air and decarbonizing fluid in separate containers are adapted to be co-mingled and fed to and through the manifold. A tube assembly has an output tube and two parallel input tubes operatively coupled. The output tube is coupled to the central bore and the two parallel input tubes are coupled to the containers for dispensing pressurized decarbonizing fluid. Four short tubes are coupled to the lateral bores and second ends have a rigid cylindrical nozzle selectively positionable within a spark plug for the delivery of a spray of pressurized decarbonizing fluid. Four switches are coupled to the manifold adjacent to the interface between a short tube and a short bore for selectively allowing or precluding the flow of decarbonizing fluid.

Still further objects and advantages will become apparent from a consideration of the ensuing description and accompanying drawings.

BRIEF DESCRIPTION OF THE DRAWINGS

FIG. 2 is a sectional view of the 90 degree sprayer tip with a 360 degree spray nozzle tip attachment.

FIG. 3 is a sectional 90 degree view of the Direct Injection tip attachment.

FIG. 4 is a sectional view of the 12-inch Dual Y Connector Hose attachment.

FIG. 5 is a sectional view which depicts a 12-inch extension adapter hose attachment.

FIG. 6 is a sectional view of the "S" spray tip with 360 degrees spray nozzle tip attachment.

FIGS. 10A, 10B, 10C and 10D illustrate the addition of the various fluids to the system.

FIG. 17 is a side elevational view of the manifold shown in FIG. 16.

FIG. 18 is an illustration of the cylindrical member adapted to be positioned into a spark plug opening of an engine to be decarbonized.

FIG. 19 is an end view of the cylindrical member taken along line 19—19 of FIG. 18.

FIG. 22 is a schematic showing of the assembly for removing fluid from the spark plug opening of the engine to be decarbonized.

FIG. 25 is an illustration of the bent tube shown in FIG. 22.

FIG. 26 is a perspective illustration of the assembly for introducing a supplemental cleaning liquid into the manifold of an engine being decarbonized.

FIG. 27 is a perspective illustration of the nozzle end of the mechanism shown in FIG. 26.

SUMMARY

A fuel system, air induction cleaning apparatus, an independent system, attachable to the engine with an extended hose, utilizing the appropriate attachment tool making it versatile enough for a variety of engines and using a compressed source to pressurize the chemical so that it can be atomized through the air induction and fuel system of the engine, resulting in a thorough cleaning.

DESCRIPTION OF THE PREFERRED EMBODIMENT

Figure 1:
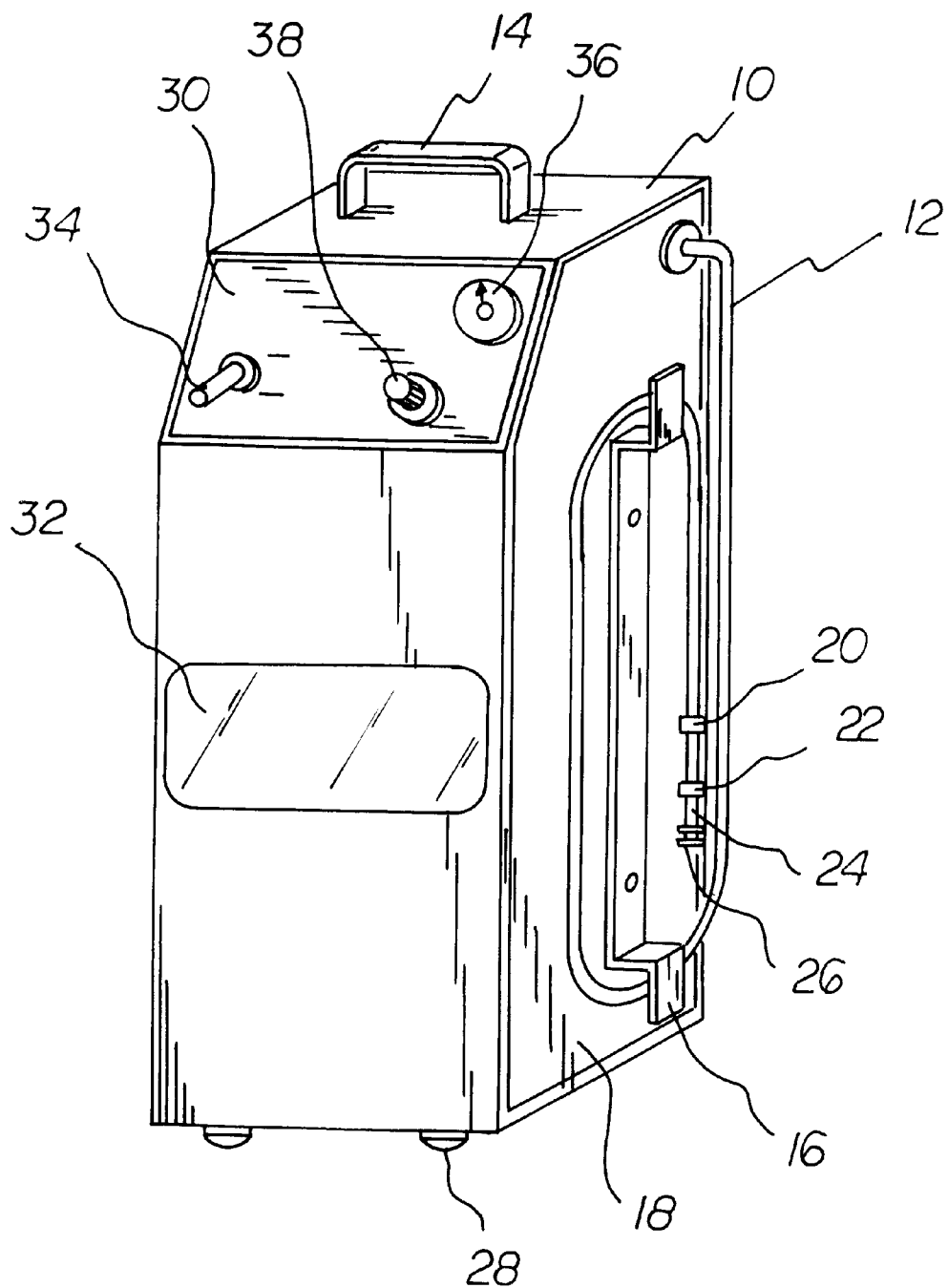
FIG. 1 is an overall perspective of the exterior cabinet of the machine and the various components of the invention which start, stop and adjust the machine.

An embodiment of the machine invented is depicted in FIG. 1. It shows the exterior features of the machine. The exterior is painted with a powder coat paint, FIG. 1 (10), which insures a longer lasting visually appealing machine due to the fact that the exterior will be resistant to damage from the chemicals used.

A name pate, FIG. 1 (32), is made out of lexan which is resistant to the chemicals used in the process.

A control panel, FIG. 1 (30), is covered with lexan to assure longer durability and resistant to the chemical used in the process.

The side of the machine from where a hose, FIG. 1 (12), extends is covered with a side panel of Texan, FIG. 1 (18), for durability.

A handle, FIG. 1 (14), is made of chrome and angled. The placement of the handle insures balance when the machine is picked up. Due to the size, shape and weight of the machine, the placement of the handle assures easy mobility and stability of the machine.

A bracket, FIG. 1 (16), is placed on one side of the machine to wrap a stainless steel braided teflon lined chemical delivery hose, FIG. 1 (12). This material is preferred due to its high tolerance to the chemical composition, since chemicals are flushed through it on a frequent basis. Additionally, the aforementioned hose is covered in plastic so that surfaces are not damaged when they come into contact with the stainless steel braided hose. It also prevents contact between the metal of the hose and the positive battery terminal.

The machine is seated on four adjustable feet, FIG. 1 (28), which facilitates leveling the machine.

At the end of the chemical delivery hose, FIG. 1 (12), is a stainless steel in-line strainer, FIG. 1 (20). This is used to insure that only liquid is pressurized with the machine so as to avoid hard particles entering the engine's system.

The chemical flow is controlled with an on/off brass ball valve at the end of the hose, FIG. 1 (22).

As the chemical is pressurized through the hose, a brass sight glass, FIG. 1 (24), is utilized to observe the chemical flow. The presence of chemicals indicates that the process is continuing and the lack of chemical indicates that the process has not begun or has terminated.

At the end of the chemical delivery hose, FIG. 1 (12), a brass quick disconnect with a viton seal, FIG. 1 (26), is present. This provides an easy, fast and secure uniting of the machine with its attachments, FIG. 1. It is this feature which adds to the machine's uniqueness and versatility so that with the selection of accessory tips a variety of engines can benefit from this process.

The front operating panel of the machine has three important features which control the process. These controls make the process easy to perform.

A brass on/off ball valve, FIG. 1 (34), is used and is resistant to the chemical used.

A pressure gauge, FIG. 1 (36), measurable from 0 psi to 100 psi indicates the amount of air pressure processed in the machine. It is connected to an outside air hose supply, therefore, monitoring this pressure is necessary.

A pressure regulator, FIG. 1 (38), is controlled by pulling "OUT" to adjust and pushing "IN" to lock. This feature is set before beginning the process.

FIGS. 2 through 6 are separate tips and attachments for the machine. Each attachment can be connected with the quick disconnect, FIG. 2 (26), at the end of a delivery hose, FIG. 1 (12), on the machine. The variety of tips, attachments and extension allow the process to be performed on a variety of engines.

A brass nipple, FIG. 2 (40), for a quick disconnect is at one end of the attachment. A 90 degree seamless stainless steel ⅛ inch diameter tubing, FIG. 2 (42), is used with a 360 degree spraying tip, FIG. 2 (44). An attachment like this will be used on engines with either throttle body injection (TBI) or a carburetor.

A TBI system utilizes a single injection (some units use two) located inside a carburetor-like casting which is installed, just like a carburetor which is located in the center of the manifold on V6 and V8 engines, or to the side, on inline motors. because of the throttle body's centralized location, some of the air-fuel mixture can still drop out of suspension as it travels from a throttle body to the intake port. In actuality, it is not much better than a carbureted engine.

Another attachment is pictured in FIG. 3. A brass nipple for a quick disconnect, FIG. 3 (40), and a 90 degree stainless steel direct injection tip, FIG. 3 (48). This attachment is used on carbureted engines only.

Operation

Use Engine Enhancer™ Aerosol Pre-cleaner to clean the carburetor or TBI air induction entrance. With the engine off, open the butterfly to the fully open position. Use the Engine Enhancer™ Aerosol Pre-Cleaner to clean around both the sides and edges of the butterfly. Continue to clean the opening to remove any heavy buildup of contaminant.

Start the engine and spray the pre-soak solution into the engine through the carburetor or TBI and into the intake manifold, intake valves and combustion chamber. Keep engine running. Do not stall during the cleaning. Should the engine stall, stop cleaning immediately and restart the engine. Allow the engine to reach its normal operating temperature.

Pour Step 1 Engine Enhancer™, fuel tank additive, into the gas tank. Do not spill the chemical.

Pour Engine Enhancer™ Oil Fortifier into crankcase.

Figure 7:
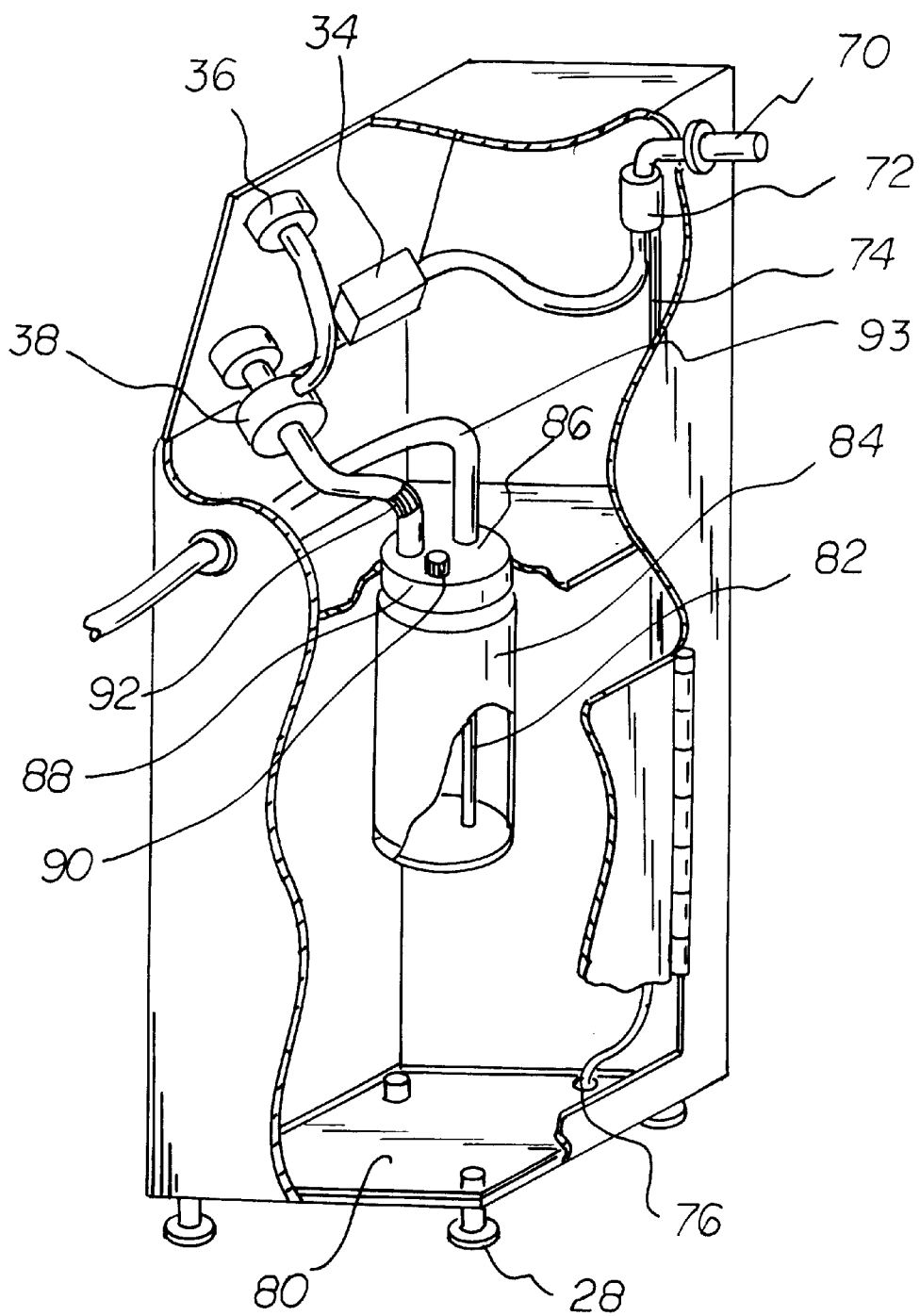
FIG. 7 is an overall perspective of the interior of the invention and the various components which make up the invention.

Place the machine, FIGS. 1 and 7, next to the vehicle. The machine should be set at the "OFF" position, FIG. 1 (34), and the product control valve, FIGS. 1 and 8 (22), at the end of the hose, FIG. 1 (12), should be positioned sideways in the "OFF" position.

Remove the canister, FIG. 7 (84), from the machine. Pour Step 4 Engine Enhancer™ chemical into the canister and return the canister to the machine. Do not spill the chemical.

Attach compressed air source hose to the air hose attachment, FIG. 7 (70), on the back on the machine.

If the vehicle is fuel injected or carbureted follow the applicable direction which follow:

If Carbureted or Throttle Body Injected (TBI)

Remove air cleaner lid and assembly if necessary.

Start the vehicle and allow it to reach its normal operating temperature.

Adjust idle between 1200 and 1600 RPM.

Upon completing the pre-cleaning process attach the hose, FIG. 1 (12), from the Engine Enhancer™ machine, FIGS. 1 and 7, to one of the following tip attachments: (1) the direct injection tip, FIG. 3 (46), or (2) the 90 degree sprayer tip to the end of product control valve, FIGS. 1 and 8 (22).

Place the Engine Enhancer™ machine to the "ON" cleaning position, FIG. 1 (34).

If using the Direct Injection tip, set the regulator to 10 PSI, FIGS. 1 and 7 (38), If using the Dual Y Connector, FIG. 4, with two direct Injection tips, FIG. 3, use 5 PSI.

If using the 90 degree sprayer tip, FIG. 2, use 40 PSI.

If using the Dual Y Connector, FIG. 4, with two 90 degree sprayer tips, FIG. 2, use 20 PSI.

Place the Direct Injection tips, FIG. 3, or 90 degree sprayer tips, FIG. 2, in the carburetor/TBI. Open the on/off chemical control valve, FIGS. 1 and 8 (22). The tips should be pointed towards the carburetor/TBI.

If the carburetor/TBI is a two barrel, use the Dual Y Connector Hose, FIG. 4, with the proper tips inserted in each barrel creating an even distribution to the engine.

Figure 8:
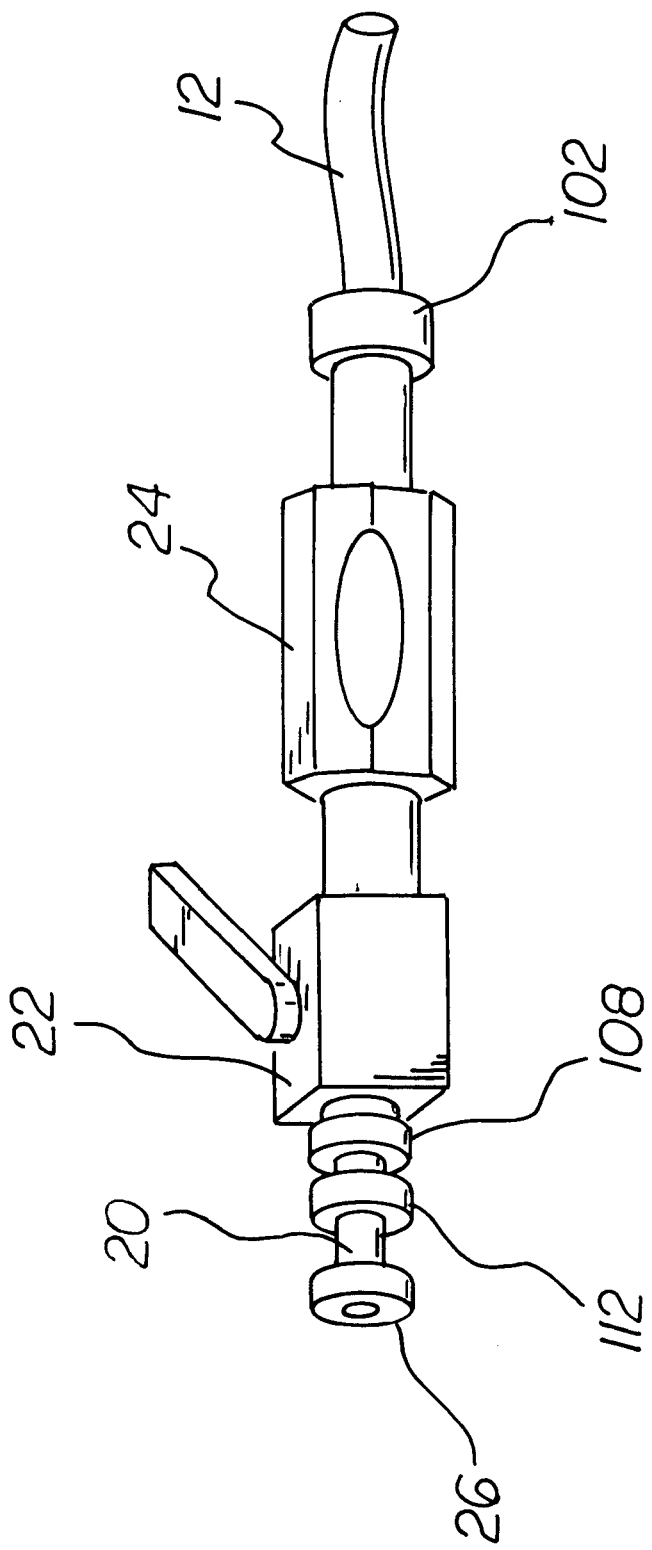
FIG. 8 is a sectional view showing details of the end of the chemical delivery hose.
Figure 9:
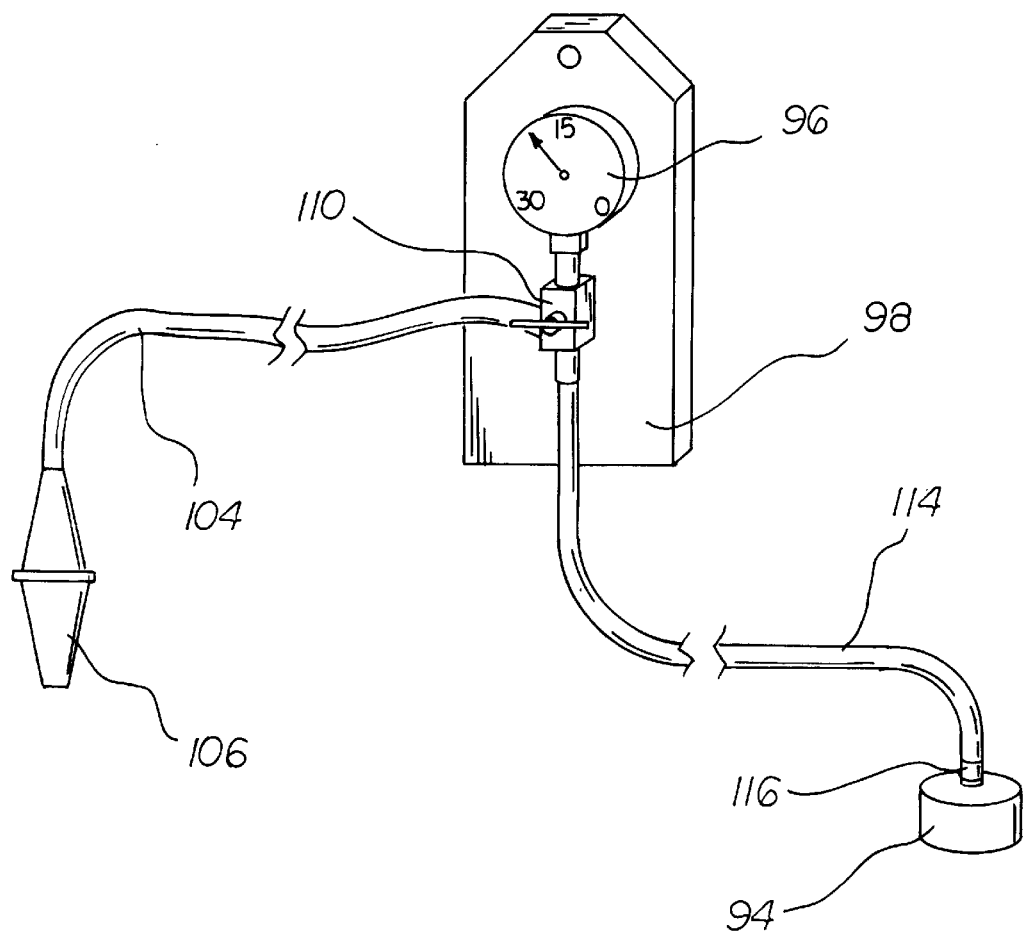
FIG. 9 is a sectional view of the vacuum delivery tool attachments.

It may be necessary to use the on/off control valve, FIGS. 1 and 8 (22), at the end of the hose, FIG. 1 (12), to control the chemical as the process is done. This is accomplished by turning the valve, FIGS. 1 and 8 (22), on and off as the cleaning takes place. Do this to avoid stalling the engine, while maintaining the rpm (1200 to 1600).

The best cleaning will be achieved if the process is performed at the lowest possible rpm.

Continue until the chemical is gone (approximately 5 minutes).

Do not allow the engine to rev at a high RPM when performing this process. There will be a risk of damaging the engine by doing so.

Note: Do not let the engine stall. If it does, immediately shut off the product control valve, FIGS. 1 and 8 (22), restart the engine, and continue the process until the chemical product is depleted.

When the product is completely gone, FIG. 8 (24), turn the cleaning valve, FIGS. 1 and 8 (2), to "OFF" at the control panel.

Disconnect compressed air source from the Engine Enhancer™ machine, FIG. 7 (70). Open on/off product control valve, FIGS. 1 and 8 (22), and bleed down remaining pressure from the Engine Enhancer™ machine.

Let remaining product go into the carburetor/TBI. When the product is completely depleted, shut the product control valve, FIGS. 1 and 8 (22), at the end of the hose, FIG. 1 (12), to "OFF" and wrap the hose back.

If Injected, Multi Port Fuel Injection

Turn engine off and remove the air intake boot from the throttle body or air induction entrance.

Place a shop rag below the throttle body or air induction entrance to absorb any residual fluid.

Perform the initial cleaning of the throttle body or air induction entrance by using Engine Enhancer™ Pre-cleaner Aerosol.

Open the throttle body to a fully open position. With the engine still off use another shop rag to clean around the edges of the butterfly, both sides and the opening itself to remove any heavy build-up of contaminants.

When everything is clean of the varnish and build-up, completely dry the area. Remove all shop rags.

Start the engine and allow it to reach its normal operating temperature.

Adjust the idle between 1200 rpm and 1600 rpm. Start spraying the Engine Enhancer™ Pre-cleaner aerosol into the air induction entrance with intermittent blasts. This is done to pre-soak the plenum, intake runners manifold, intake valves and combustion chamber.

Do not allow the engine to stall. If the engine does stall, stop cleaning immediately and restart the engine. Shut off engine when the components are soaked and clean.

Note: This procedure can only be performed on an engine that will run with the air intake boot off.

Once the Pre-cleaning is complete, take the hose, FIG. 1 (12), from the Engine Enhancer™ and attach the "S" sprayer tip, FIG. 6 (40, to the end of the product control valve, FIGS. 1 and 8 (22), using the quick disconnect fitting, FIGS. 1 and 8 (26).

Turn the Engine Enhancer™ machine to the ON cleaning position, FIG. 1 (34), located on the front control panel and set the regulator, FIG. 1 (38), to 40 PSI. If using Dual Y Connector hose, FIG. 4, with two "S" sprayer tips, FIG. 6, use 20 PSI.

Place the "S" sprayer tips, FIG. 6 (40, into the throttle body air induction entrance centered and straightened. With the sprayer in place, reset the boot (air induction hose) and tighten the clamp. Once in place, restart the engine.

Open the on/off product control valve, FIGS. 1 and 8 (22). The chemical will begin to be discharged through the sprayer tips (FIGS. 2, 3, 5 and 6), and start the cleaning process.

Use the product control valve, FIGS. 1 and 8 (22), at the end of the hose, FIG. 1 (12), to control the flow of chemical as the process is performed. This is done by turning the valve ON and OFF. The engine should remain running and maintain an idle RPM. The best cleaning will be accomplished at the lowest possible RPM.

Continue until the chemical product is depleted, approximately 5 to 10 minutes. The engine should not be allowed to stall. However, if it does stall, immediately shut off the product control valve, FIGS. 1 and 8 (22), and restart the engine. Continue until the chemical product is gone.

When finished, disconnect the compressed air source from the Engine Enhancer™ machine and shut the on/off valve, FIGS. 1 and 8 (22) to OFF.

Open the product control valve, FIGS. 1 and 8 (22), and bleed down remaining pressure and product from the machine.

Shut off the engine and let the engine set for approximately five minutes. Loosen the clamp and remove the boot and air induction hose. Remove the "S" sprayer tip, FIG. 6 and secure the boot to the engine and tighten.

Test drive the vehicle for 5 to 10 miles, accelerating rapidly several times to clean out the remaining chemical product and complete the process.

Note: Vehicle may smoke during the test drive. This is normal. If a test drive is not possible, let the vehicle run for 20 to 30 minutes, revving the engine periodically to burn off and clean out remaining contaminants.

Conclusions, Ramifications and Scope

Accordingly, the Engine Enhancer™ machine can be successfully used by trained vehicle service technicians. The cabinet size enables it to be moved around and operated easily and effectively.

The 9 foot hose allows the chemical to be remote from the engine being serviced.

Additionally, this machine pressurizes with air. No electricity is needed.

The regulator, ON/OFF valve, and pressure gauge do not allow chemical to travel through and destroy the engine's sensitive components.

The sight glass, product control ON/OFF valve, strainer, quick disconnects, multiple extension attachments and tips for various types of engines are additional features which make this machine even more unique.

The present invention is thus in a cleaning system 200 for engines 202 of vehicles of the type having an engine for combusting fuel and converting the combusted fuel to mechanical energy, the vehicle of the type also having (1) a fuel tank 204 for supplying fuel to the engine for combustion purposes to create mechanical energy, and (2) a crankcase 206 for converting the mechanical energy from the engine into motive forces, and (3) a throttle body 208 for varying the air intake to the engine to support the combustion of the fuel, and (4) an air induction assembly 210 with an intake cylinder 211 for the supplying of varying amounts of air to the engine for mixing with the fuel, includes a first liquid 212. The first liquid constitutes a fuel additive providable to the fuel tank. The first liquid comprising a super concentrated formula of cleaning solvents and a high quality lubricant to clean and lubricate from the fuel tank to the injectors.

Next included is a second liquid 214. The second liquid constitutes an oil fortifier providable to the crankcase. The second liquid comprises a super concentrated formula of friction reduced, extreme pressure additives and a base light weight oil to protect the engine during the process and help the engine run smoothly after it is completed.

A third liquid 216 is included and constitutes an air intake cleaner providable to the throttle body. The third liquid comprises an aerosol spray formulated with cleaning solvents and lubricant to pre-clean the throttle plate and/or carburetor.

A fourth liquid 218 is included and constitutes an engine enhancer. The fourth liquid comprises a super concentrated formula of carbon cleaning solvents and a high quality of lubricant to clean and lubricate the air induction system.

Figure 15A:
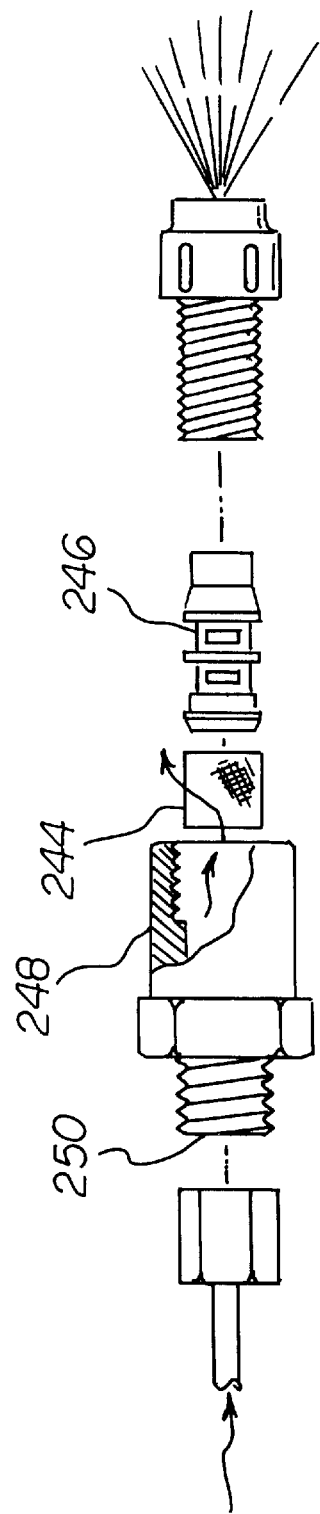
FIGS. 15A and 15B are various views of the nozzle assembly.
Figure 15B:
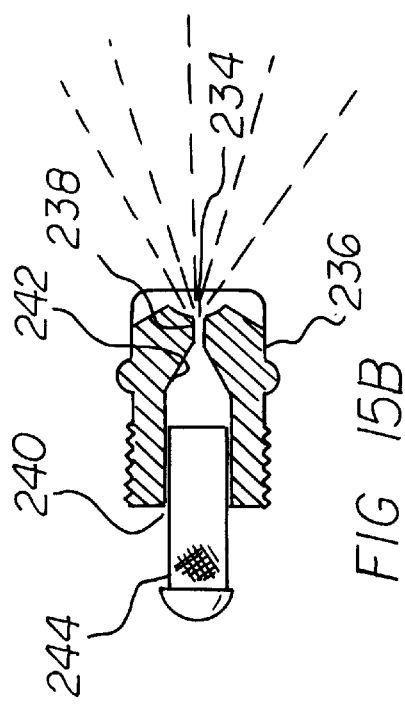
Figure 16:
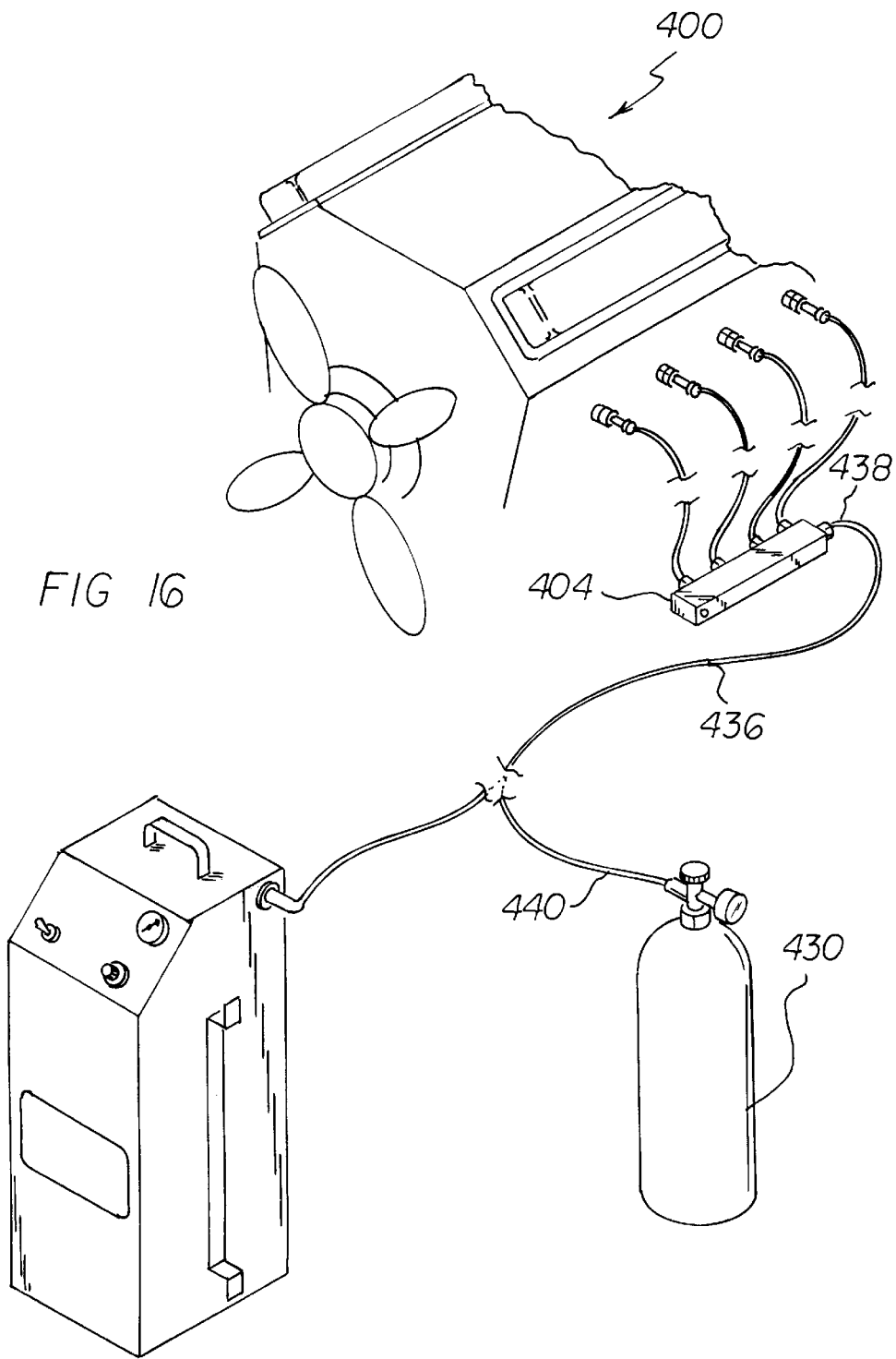
FIG. 16 is a perspective illustration of the new and improved engine decarbonizing system constructed in accordance with the principles of the present invention, alternate inputs being shown.
Figure 20:
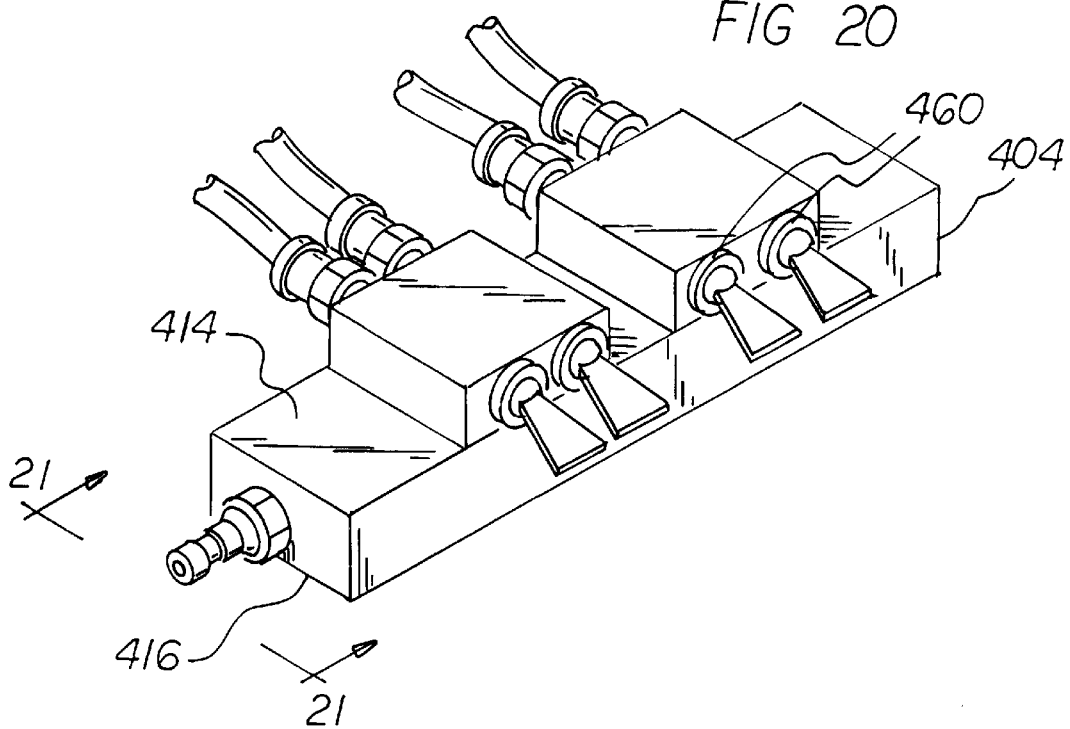
FIG. 20 is an enlarged perspective view of the manifold showing switches thereon.
Figure 21:
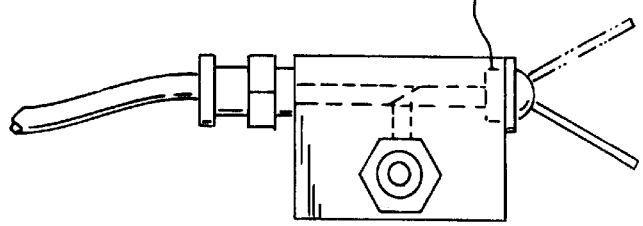
FIG. 21 is an end elevational view taken along line 21—21 of FIG. 20.
Figure 23:
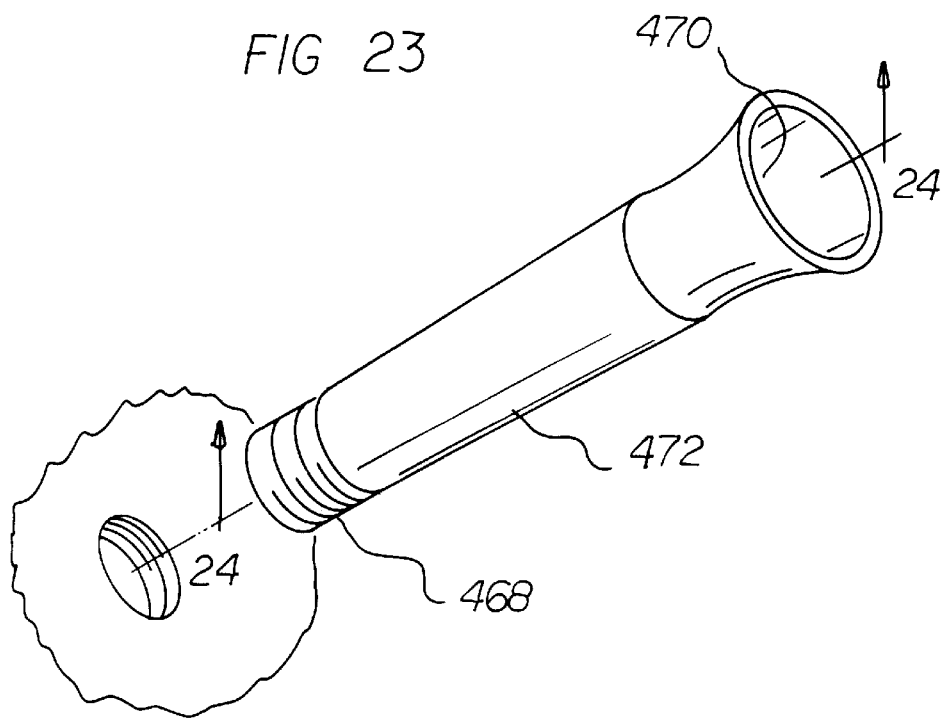
FIG. 23 is an enlarged perspective showing of the sleeve illustrated in FIG. 22.
Figure 24:
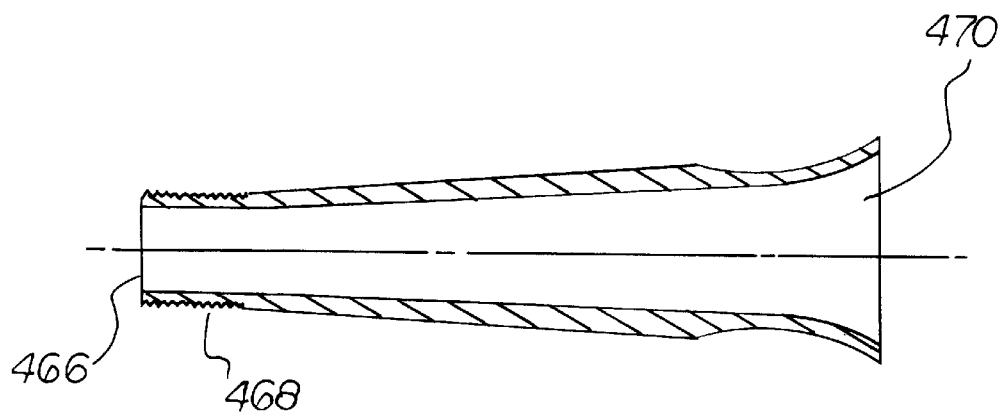
FIG. 24 is a cross sectional view taken along line 24—24 of FIG. 23.

Next provided is a delivery assembly 222 for the fourth fluid. The delivery assembly comprises a tube 224 having an input end 226 and an output end 228. A supply tank 230 is provided and contains an initial supply of the fourth fluid. The supply tank is coupled to the input end of the tube. A source of pressurized air 232 into the supply tank of the fourth fluid is provided and functions to apply a continuous source of pressure to effect the movement of the fourth fluid from the supply tank through the tube toward the output end into the air flow in advance of intermixing with the fuel. A nozzle 234 is provided at the output end of the tube. Note FIGS. 15A and 15B. The nozzle includes a main body portion 236 with a small cylindrical outlet 238 having a diameter of about 1/32 inch plus or minus 10 percent and a cylindrical inlet 240 having a diameter of about 3/16 inch plus or minus 10 percent. A frustoconical transition zone 242 between the inlet and the outlet is provided. The nozzle also has a cylindrical filter 244 with a mesh formed with an opening to preclude the passage of solid particles having a maximum dimension of about 5 micron stainless steel mesh and with a hollow cylindrical support block 246 within a portion of the filter to allow passage of fluid through the nozzle and out of the outlet. The nozzle also includes an enlarged housing 248 encompassing the screen and the block and a portion of the main body portion remote from the outlet with an inlet orifice 250 coupled to the outlet of the tube.

Lastly, a retention assembly 254 is provided. The retention assembly is adapted to fixedly position the nozzle in operative position adjacent to the air intake assembly. In this manner when the engine is running and pressure is applied to the supply tank, an atomized flow of fourth fluid will be sprayed into the air induction system to intermix with air in an even continuous manner at a location in advance of a location where the air is intermixed with the fuel being fed to the engine.

Figure 11:
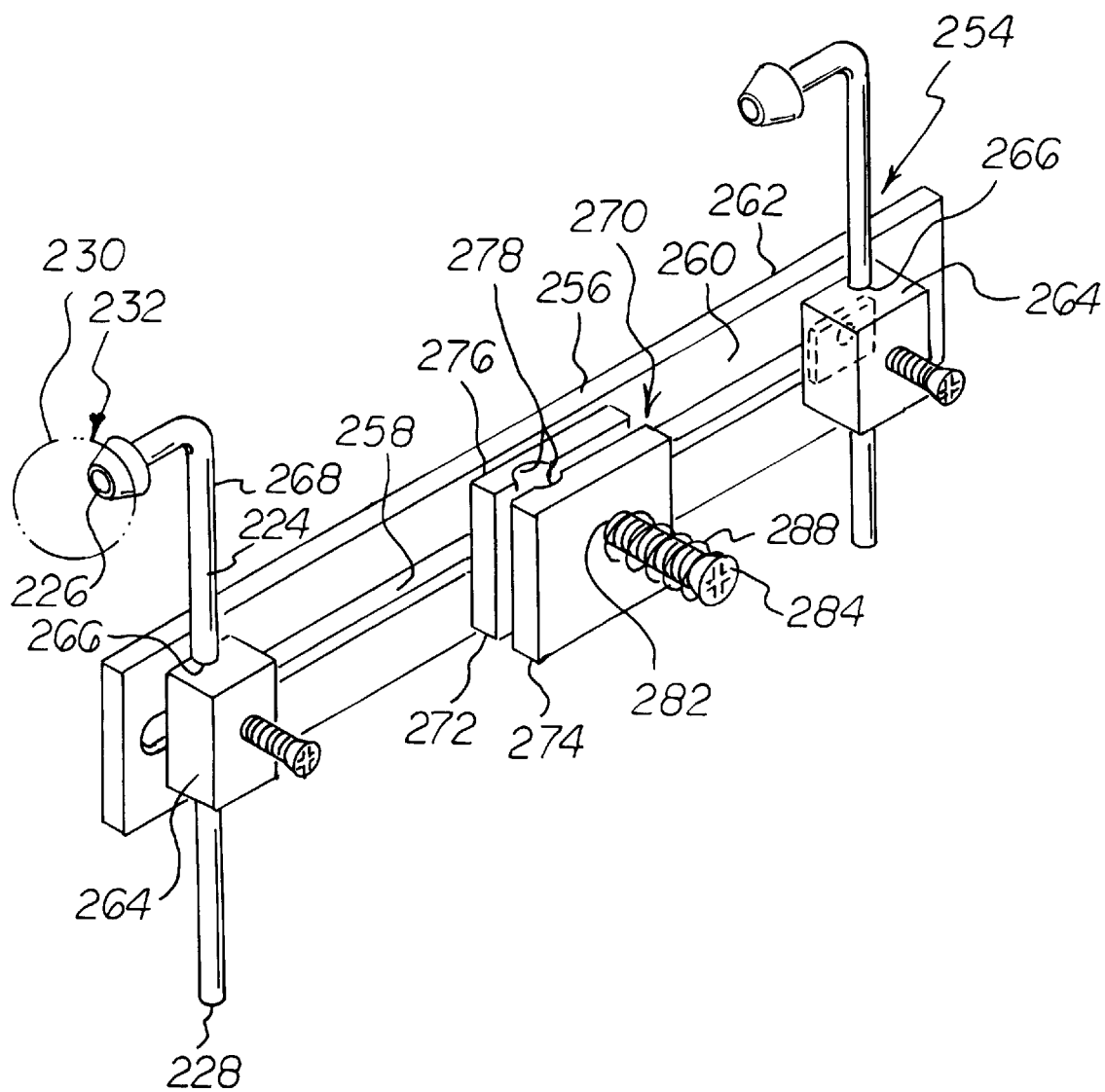
FIG. 11 is a perspective illustration of the retention mechanism constructed in accordance with the principles of the present invention.

In the primary embodiment, as shown in FIG. 11, the retention assembly includes an elongated plate 256 with a central slot 258 centrally along the majority of its length. The plate has a front surface 260 and a rear surface 262 with a pair of end blocks 264. Each of the end blocks is in a generally rectilinear configuration. An interior face of each end block is formed with a vertical semi-cylindrical notch 266 positioned adjacent to the front surface of the plate. The notch is adapted to receive a tube 268 coupling the supply tank with the air induction system.

The embodiment of FIG. 11 is primarily designed for use in association with the commercially available General Motors throttle body injection (TBI) induction systems systems as well as any other TBI systems or carburetors upon which it will work, i.e., similarly configured TBI systems of any and all other manufacturers.

Further included is a block subassembly 270 with an interior block 272 and an exterior block 274. The interior block has a rear face 276 in contact with the front surface of the plate. The blocks of the block subassembly have facing semi-cylindrical notches 278 for the receipt of an upstanding threaded central member of a carburetor with the air filter removed. Each of the blocks is formed with a horizontal aperture 282 therethrough. A threaded bolt 284 extends through each block and a preselected portion of the slot of the elongated plate. A nut, only one of which is shown, is coupled to the bolt. The nut is in contact with the rear surface of the plate. A spring 288, only one of which is shown, encompasses each bolt between its associated block and the head of the bolt for resiliently holding the lines and threaded fastener in proper position with respect to each other.

Figure 12:
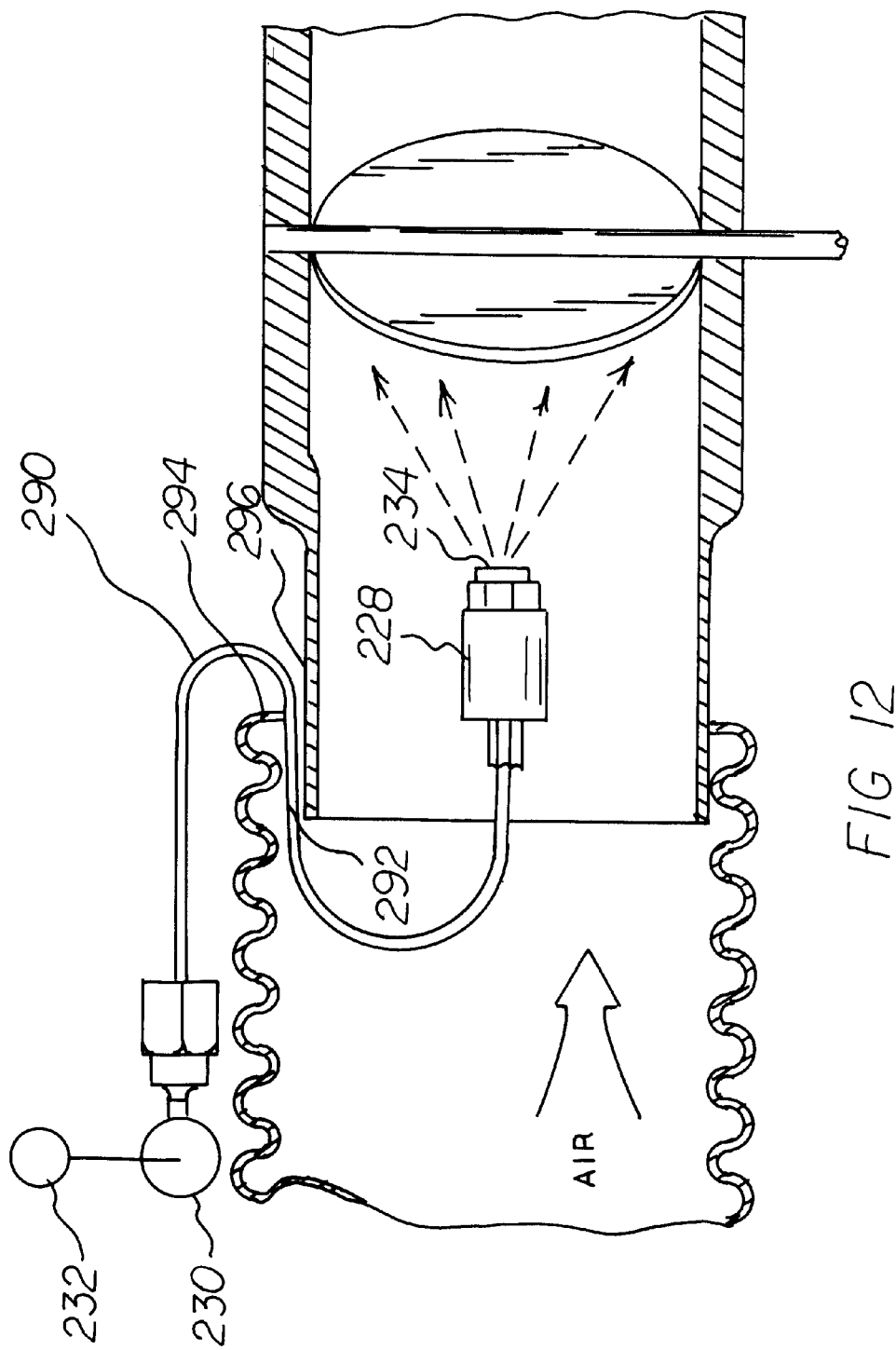
FIG. 12 is a perspective illustration depicting how the "S" spray tip is used in an atypical air induction system.

In an alternate embodiment, as shown in FIGS. 6 and 12, the retention assembly includes a rigid pipe 290 in a generally S-shaped configuration. A central elongated extent 292 of the rigid pipe is positionable between a resilient inner intake boot 294 and the exterior surface 296 of an intake cylinder 211.

Figure 13:
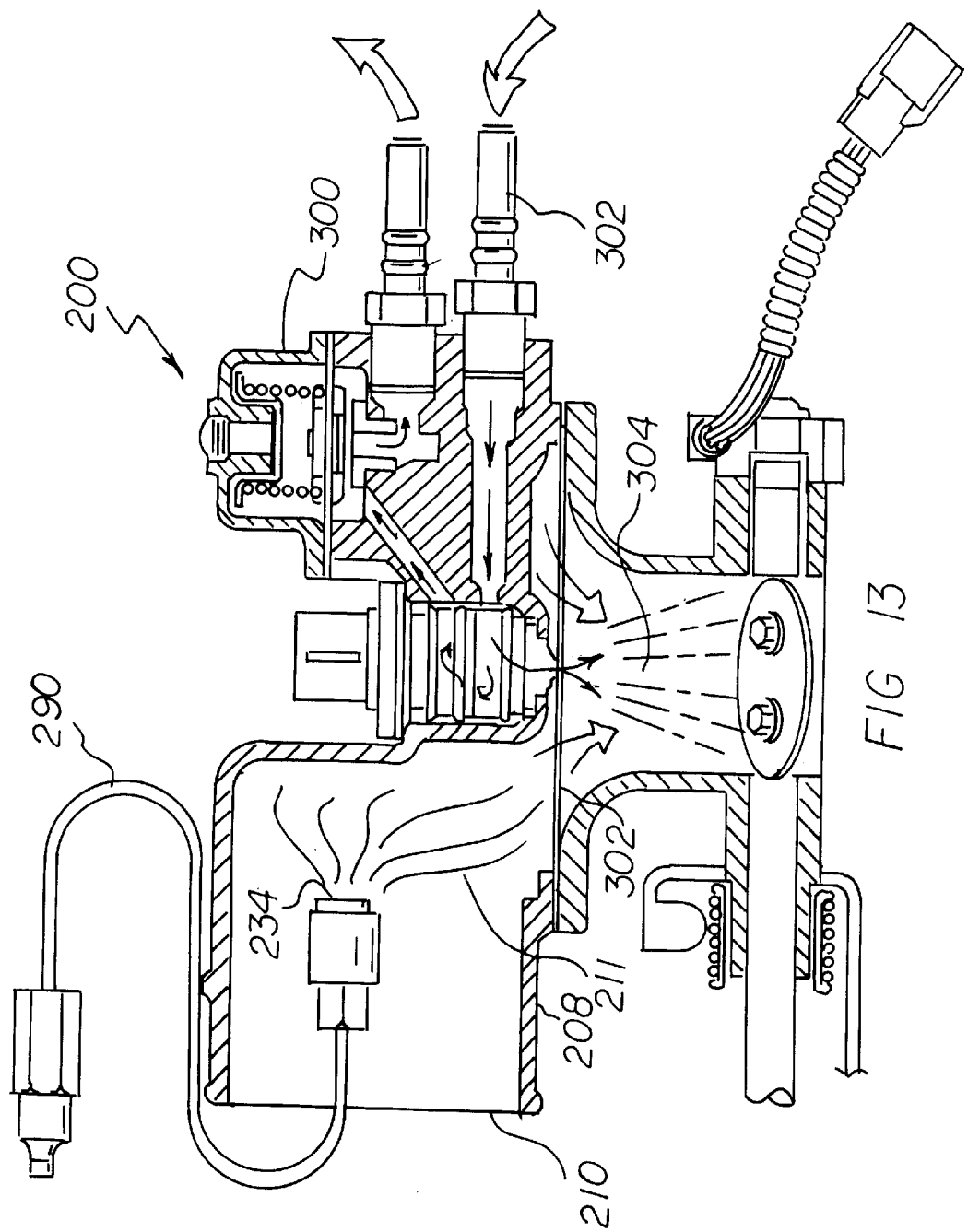
FIG. 13 is an expanded illustration of a throttle body injector and fluid being added to the engine.

FIG. 13 shows this FIG. 12 embodiment in greater detail with the fuel regulator 300 and fuel inlet and with the fuel being intermixed with the inlet air 302 being subsequently intermixed with the fuel 304.

Figure 14:
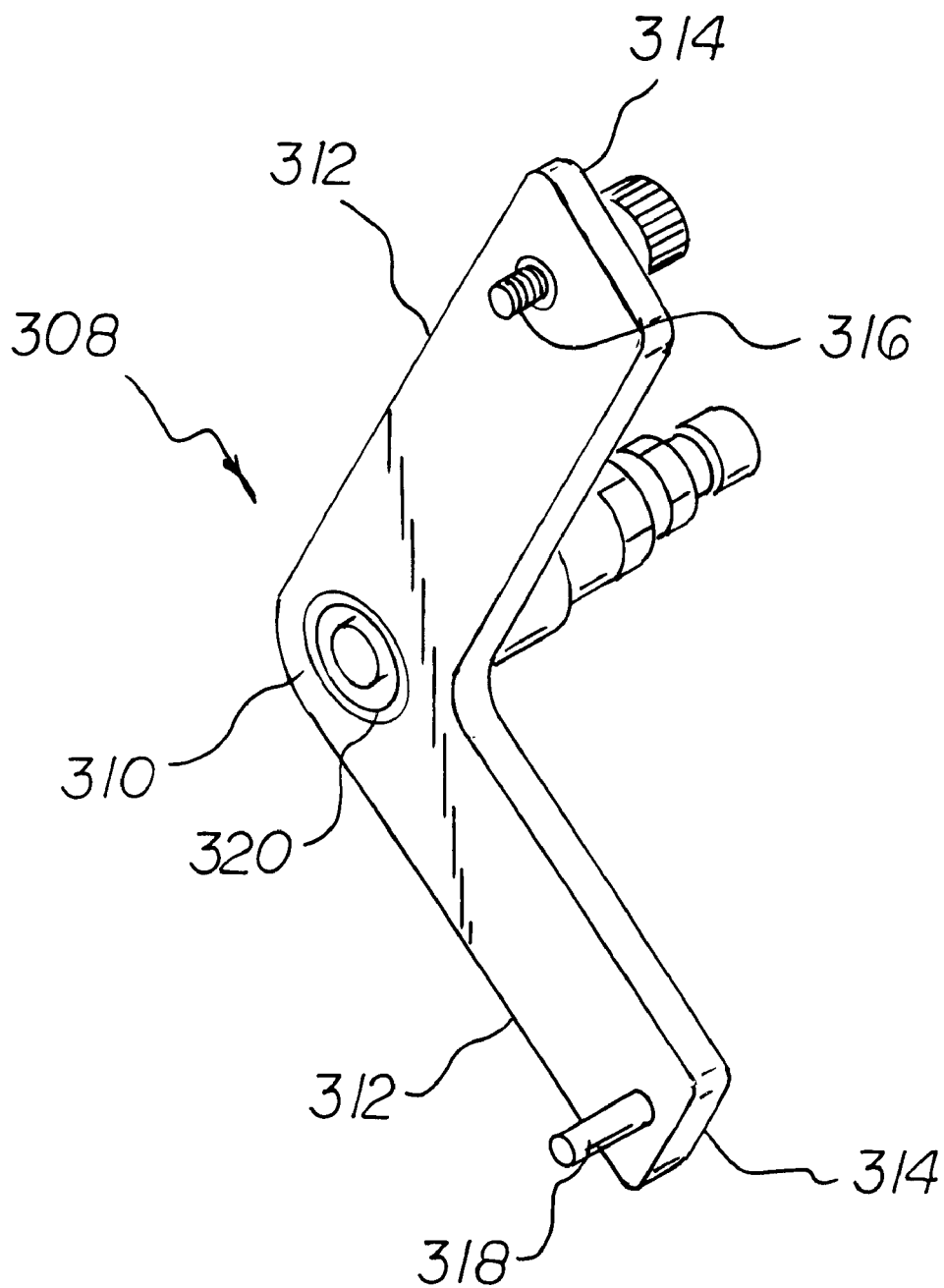
FIG. 14 is yet another alternate embodiment of a retention mechanism for carrying out the present invention.

As can be seen in FIG. 14, another alternate embodiment is such that the retention assembly includes an adapter 308. The adapter has a central region 310 with radially projecting legs 312. Each leg has an exterior end 314 with a projection 316, 318 for receipt in an associated aperture of a throttle body. At least one of the projections is threaded and rotatable for removable coupling with a threaded aperture of the throttle body. A central aperture 320 there through for the receipt and support of a nozzle.

The L-shaped adaptor 308, as shown in FIG. 2, is a "manufacturer specific" adapter. This adapter is made for G.M. Northstar engines and any and all other engines using the same throttle body.

Another alternate embodiment can be seen in FIG. 4 and features a retention assembly which includes a pair of tubes 54 coupling the supply tank and spaced inlets of the air induction system of a vehicle.

The final embodiment of this invention, an engine decarbonizing system 400 for decarbonizing internal combustion engines in an efficient and simplified manner, is shown in FIGS. 16 through 26. In this embodiment a manifold 404 is provided. The manifold is in a generally rectilinear configuration with two small parallel end faces 406, 408 and four large rectangular side faces 410, 412, 414, and 416. One long linear cylindrical central bore 418 extends inwardly from one end face and four short linear cylindrical lateral bores 420, 422, 424, 426 extend from the central bore to an adjacent side face 410.

Pressurized air is provided in a first container 430. Decarbonizing fluid is provided in a second container 432. The container may be of the type shown in FIGS. 1 and 7. In the alternative, the air and fluid may be in a separate container 430 for the dispensing purposes.

Next provided is a flexible elongated tube assembly 436. The tube assembly has an output end 438 and input end 440. The output tube is operatively coupled to the central bore and the input end is coupled to the pressurized air and the decarbonizing fluid of the container for dispensing pressurized decarbonizing fluid to and through the manifold.

Four flexible short tubes 448 are provided. The short tubes have first ends 450 respectively coupled to the lateral bores. Second ends 452 each have a rigid cylindrical nozzle 454 selectively positionable within a spark plug opening 456 of an internal combustion engine 458 to be decarbonized for the delivery of a spray of pressurized decarbonizing fluid.

Next provided are four switches 460. Each switch is individually coupled to the manifold adjacent to the interface between a short tube and a short bore for selectively allowing or precluding, at the discretion of a user, the flow of decarbonizing fluid from the manifold to an associated nozzle and spark plug opening as a function of the number of spark plug openings to receive decarbonizing fluid.

Next provided is a rigid generally cylindrical suction guide tube 464. The tube has an interior end 466 with exterior threads 468 adapted to be threadedly received within each spark plug opening of an engine to be decarbonized. The suction guide tube also has an input end 470 with a frusto-conical configuration spaced from the interior end. The suction guide tube also has an intermediate section 472 between the interior end and the input end. The suction guide tube is adapted to guide the entry of the probe into the spark plug openings.

A suction assembly 474 is next provided. The suction assembly has a base 476 beneath and a handle 478 above. The suction assembly also has an air pump 480 positioned on the base. Inlet tubing is provided to create a vacuum and outlet tubing 482 is provided to exhaust air. The suction assembly also has a can 484 removably positioned on the base and operatively coupled between the inlet and outlet tubing to collect suctioned decarbonizing fluid fed through the tubing from the manifold. The suction assembly also includes an elastomeric probe 486. The probe has limited flexibility. The probe has a linear long section 488 coupled to the inlet tubing and a linear short section 490 with an obtuse angle of about 270 degrees there between. The short section is adapted to be inserted through a guide tube into a spark plug opening for withdrawing the decarbonizing fluid from the engine.

Lastly, a supplemental cleaning assembly 494 is provided for projecting a spray of supplemental cleaning liquid through the intake manifold of an engine after an initial decarbonizing. The supplemental cleaning assembly has a flexible tube 496. The flexible tube has an input end 498 coupled to a pressurized supply 500 of supplemental cleaning liquid. The flexible tube also has an output end 502. The supplemental cleaning assembly also has a rigid plate 504. The rigid plate is couplable to the engine adjacent to the intake manifold of an engine with a spray head positioned within the intake manifold on the side of the plate remote from the tube for the spraying of supplemental cleaning liquid into the manifold. The rigid plate is formed with two laterally spaced arcuate sections 506 with bolt holes 408 there through for securement to an engine spanning the intake manifold. An upper arcuate section 510 of the rigid plate is of an enlarged diameter and a lower arcuate section 512 is of a reduced diameter.

There are five preferred liquids for use in the system and method for cleaning and decarbonizing internal combustion engines as described above. The first liquid, the fuel system and injector cleaner, adapted to be added to the fuel tank, includes (1) Napthenic Petroleum Distillate, Chemical Abstract Service Registry Number 64742-65-0, 70 to 80 percent, preferably 75 percent, by weight; (2) Aliphatic Naphtha, Chemical Abstract Service Registry Number 64742-88-7, 7.5 to 10 percent, preferably 9 percent, by weight; (3) Polyolefinamine, Chemical Abstract Service Registry Number 68891-84-9, 5 to 7 percent, preferably 6 percent by weight; (4) Propoxylated Alcohol, Chemical Abstract Service Registry Number 74499-34-6, 5 to 7 percent, preferably 6 percent, by weight; and (5) Light Aromatic Petroleum Distillate, Chemical Abstract Service Registry Number 64742-95-6, 2.5 to 5 percent, preferably 4 percent, by weight.

The second liquid, the engine oil supplement, adapted to be added to the oil crankcase, includes (1) Proprietary Calcium Detergent, Chemical Abstract Service Registry Number 61789-86-4, 20 to 30 percent, preferably 23 percent, by weight; (2) Hydrocarbon Diluent Oil, Chemical Abstract Service Registry Number 64742-65-0, 69 to 79 percent, preferably 74 percent, by weight; and (3) Fluid Modifier, Chemical Abstract Service Registry Number 68649-11-6, 1 to 10 percent, preferably 3 percent, by weight.

The third liquid, the aerosol air intake cleaner, adapted to be aerosol sprayed into the air intake system and throttle body then scrubbed, includes (1) Butyl Cellosolve, Chemical Abstract Service Registry Number 000111-76-2, 10 to 20 percent, preferably 15 percent, by weight; (2) Benzyl Alcohol, Chemical Abstract Service Registry Number 100-51-6, 40 to 50 percent, preferably 45 percent, by weight; (3) Propylene Glycol, Chemical Abstract Service Registry Number 000057-55-6, 10 to 30 percent, preferably 20 percent, by weight; (4) Ethylene Glycol, Chemical Abstract Service Registry Number 000107-21-1, 10 to 20 percent, preferably 15 percent, by weight; (5) Polyol Ester, Chemical Abstract Service Registry Number 11138-60-6, 1 to 5 percent, preferably 2.5 percent, by weight; and (6) Carbon Dioxide, Chemical Abstract Service Registry Number 128-38-9, 1 to 5 percent, preferably 2.5 percent, by weight.

The fourth liquid, the air induction cleaner and decarbonizer, adapted to be injected by sprayers while the engine is running, includes (1) Butyl Cellosolve, Chemical Abstract Service Registry Number 000111-76-2, 10 to 20 percent, preferably 15 percent, by weight; (2) Benzyl Alcohol, Chemical Abstract Service Registry Number 100-51-6, 40 to 50 percent, preferably 45 percent, by weight; (3) Propylene Glycol, Chemical Abstract Service Registry Number 000057-55-6, 10 to 30 percent, preferably 25 percent, by weight; and (4) Ehtylene Glycol, Chemical Abstract Service Registry Number 000107-21-1, 10 to 20 percent, preferably 15 percent, by weight.

The fifth liquid, the piston and ring cleaner, adapted to be added through the spark plug openings for soaking and removal, includes (1) Benzyl Alcohol, Chemical Abstract Service Registry Number 100-51-6, 40 to 50 percent, preferably 45 percent, by weight; (2) NMP, Chemical Abstract Service Registry Number 872-50-4, 45 to 55 percent, preferably 50 percent, by weight; and (3) NP 9, Chemical Abstract Service Registry Number 127087-87-0, 4 to 10 percent, preferably 5 percent, by weight.

Although the description above contains many specificities, these should not be construed as limiting the scope of the invention, but as merely providing illustrations of some of the presently preferred embodiments of this invention. Various other embodiments and ramifications are possible within its scope. For example, the cabinet size can be enlarged and the process can be performed on diesel engines, boats, and airplanes with minor alterations to the machine's attachments and chemicals.

Thus, the scope of the invention should be determined by the appended claims and their legal equivalents, rather than by the examples given.

What is claimed is:

1. An engine decarbonizing system for decarbonizing internal combustion engines in an efficient and simplified manner comprising, in combination:
    a manifold in a generally rectilinear configuration with two small parallel end faces and four large rectangular side faces and with one long linear cylindrical central bore extending inwardly from one end face and four short linear cylindrical lateral bores extending from the central bore to an adjacent side face;
    pressurized air in a container along with decarbonizing fluid adapted to be fed to and through the manifold;
    a flexible elongated tube assembly having an output end and input end, the tube being coupled to the central bore and with the input end being coupled to the pressurized air and the decarbonizing fluid of the container for dispensing pressurized decarbonizing fluid to and through the manifold;
    four flexible short tubes with first ends respectively coupled to the lateral bores and second ends each having a rigid cylindrical nozzle selectively positionable within a spark plug opening of an internal combustion engine to be decarbonized for the delivery of a spray of pressurized decarbonizing fluid;
    four switches, each switch individually coupled to the manifold adjacent to the interface between a short tube and a short bore for selectively allowing or precluding, at the discretion of a user, the flow of decarbonizing fluid from the manifold to an associated nozzle and spark plug opening as a function of the number of spark plug openings to receive decarbonizing fluid;
    a rigid generally cylindrical suction guide tube having an interior end with exterior threads adapted to be threadedly received within each spark plug opening of an engine to be decarbonized and having an input end with a frusto-conical configuration spaced from the interior end and having an intermediate section there between, the suction guide adapted to guide the entry of the probe into the spark plug openings;
    a suction assembly having a base beneath and a handle above, the suction assembly also having an air pump positioned on the base with inlet tubing to create a vacuum and outlet tubing to exhaust air, the suction assembly also having a can removably positioned on the base and operatively coupled between the inlet and outlet tubing to collect suctioned decarbonizing fluid fed through the tubing from the manifold, the suction assembly also including an elastomeric probe with limited flexibility having a linear long section coupled to the inlet tubing and a linear short section with an obtuse angle of about 270 degrees there between, the short section adapted to be inserted through a guide tube into a spark plug opening for withdrawing the decarbonizing fluid from the engine; and
    a supplemental cleaning assembly for projecting a spray of supplemental cleaning liquid through the intake manifold of an engine after an initial decarbonizing, the supplemental cleaning assembly having a flexible tube with an input end coupled to a pressurized supply of supplemental cleaning liquid and with an output end and a rigid plate couplable to the engine adjacent to the intake manifold of an engine and with a spray head positioned within the intake manifold on the side of the plate remote from the tube for the spraying of supplemental cleaning liquid into the manifold, the rigid plate being formed with two laterally spaced arcuate sections with bolt holes there through for securement to an engine spanning the intake manifold and with an upper arcuate section of an enlarged diameter and a lower arcuate section of a reduced diameter.

2. An engine decarbonizing system comprising:
    a manifold with one central bore and four lateral bores;
    pressurized air in a first container and decarbonizing fluid in a second container adapted to be co-mingled and fed to and through the manifold;
    a tube assembly having an output tube and two parallel input tubes operatively coupled, the output tube being also coupled to the central bore and the input tubes coupled to the containers for dispensing pressurized decarbonizing fluid;
    four short tubes coupled to the lateral bores and second ends each having a rigid cylindrical nozzle selectively positionable within a spark plug hole or opening for the delivery of a spray of pressurized decarbonizing fluid; and
    four switches coupled to the manifold adjacent to the interface between a short tube and a short bore for selectively allowing or precluding the flow of decarbonizing fluid.

3. The system as set forth in claim 2 and further including:
    a suction assembly having a base beneath and a handle above, the suction assembly also having an air pump positioned on the base with inlet tubing to create a vacuum and outlet tubing to exhaust air, the suction assembly also having a container positioned on the base and operatively coupled between the inlet and outlet tubing to collect suctioned decarbonizing fluid fed through the tubing from the manifold, the suction assembly also including an elastomeric probe with limited flexibility having a linear long section coupled to the inlet tubing and a linear short section with an obtuse angle there between, the short section adapted to be inserted through a guide tube into a spark plug opening for withdrawing the decarbonizing fluid from the engine.

4. The system as set forth in claim 2 and further including:
    a rigid generally cylindrical suction guide tube having an interior end adapted to be received within each spark plug opening of an engine to be decarbonized and having an input spaced from the interior end and having an intermediate section there between.

5. The system as set forth in claim 2 and further including:
    a supplemental cleaning assembly for projecting a spray of supplemental cleaning liquid through the intake manifold of an engine after an initial decarbonizing, the supplemental cleaning assembly having a flexible tube with an input end coupled to a pressurized supply of supplemental cleaning liquid and with an output end and a rigid plate couplable to the engine adjacent to the intake manifold of an engine and with a spray head positioned within the intake manifold on the side of the plate remote from the tube for the spraying of supplemental cleaning liquid into the manifold, the rigid plate being formed with laterally spaced arcuate sections for securement to an engine spanning the intake manifold and with an upper section and a lower.

* * * * *